June 5, 1962    J. H. INGOLD ET AL    3,037,942
POSITIVE TEMPERATURE COEFFICIENT OF RESISTIVITY RESISTOR
Filed Nov. 2, 1959    4 Sheets-Sheet 3

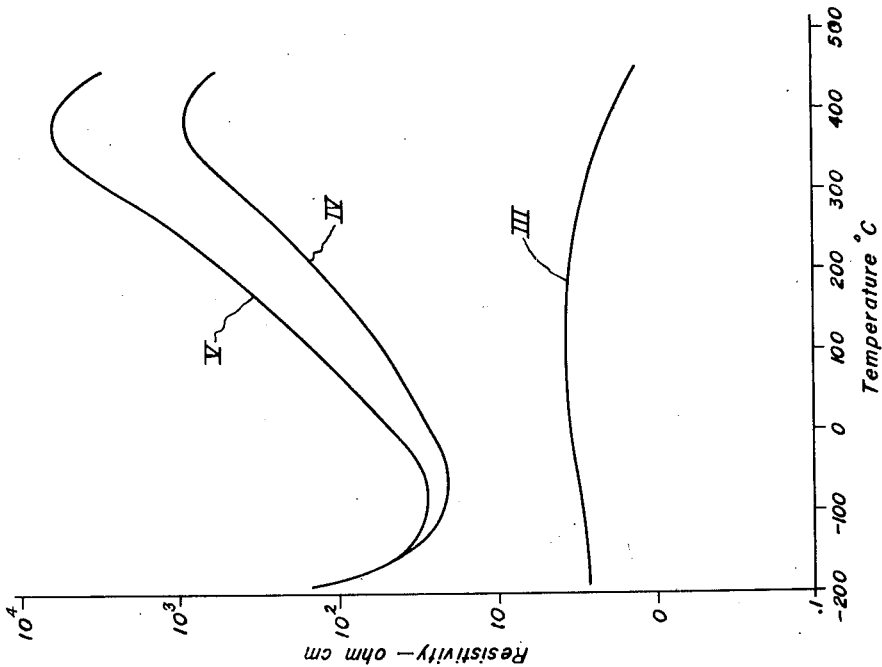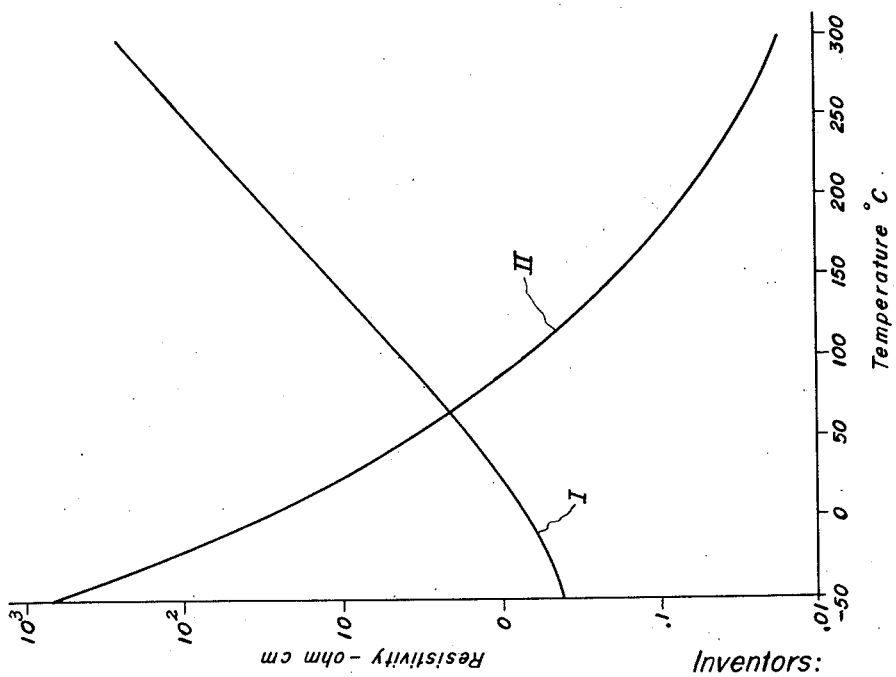

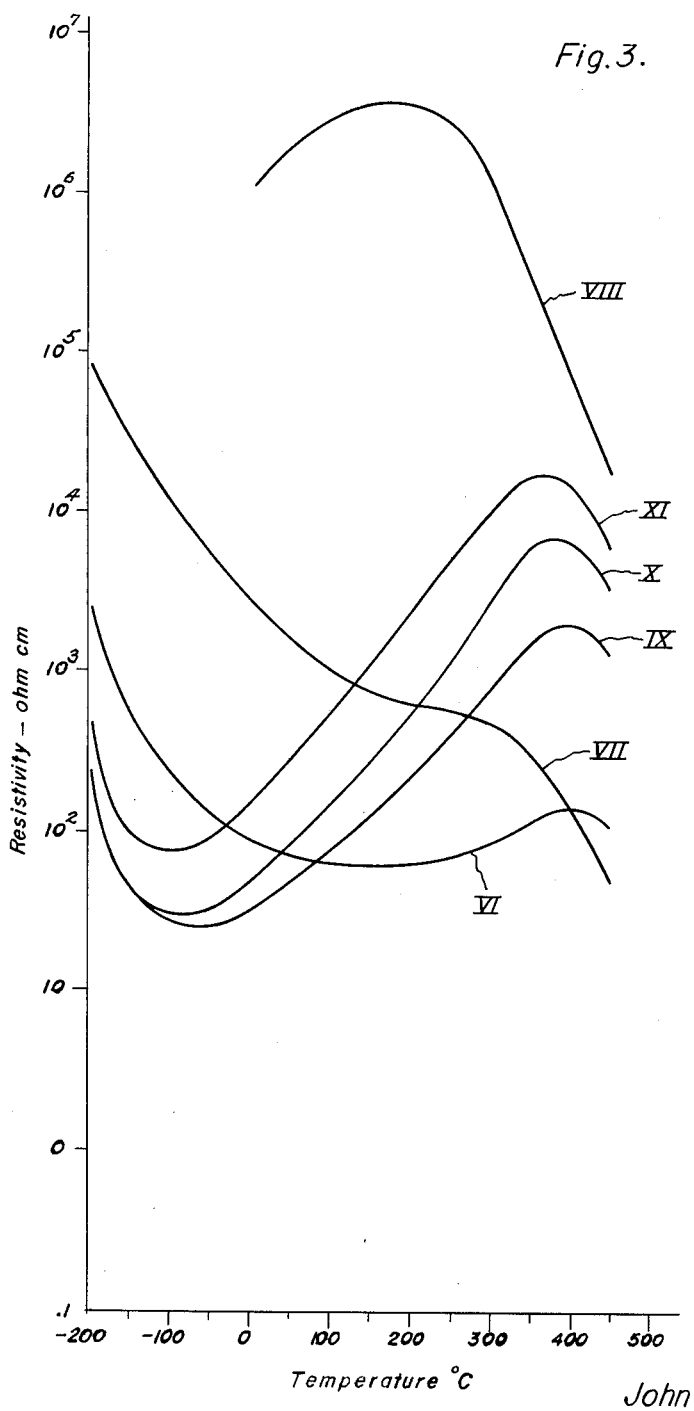

Inventors:
John H. Ingold;
Robert H. Pry,
by
Their Attorney.

Inventors:
John H. Ingold;
Robert H. Pry,
by
Their Attorney.

United States Patent Office 3,037,942
Patented June 5, 1962

3,037,942
POSITIVE TEMPERATURE COEFFICIENT OF RESISTIVITY RESISTOR
John H. Ingold, Walnut Creek, Calif., and Robert H. Pry, Schenectady, N.Y., assignors to General Electric Company, a corporation of New York
Filed Nov. 2, 1959, Ser. No. 850,226
12 Claims. (Cl. 252—519)

The present invention relates generally to electrical resistors and is more particularly concerned with a unique resistor having a positive temperature coefficient of resistivity and it is also concerned with a novel method of making this resistor.

Semiconducting ceramics having large negative changes in electrical resistance with respect to increase in temperature are generally known as thermistors and have been used rather widely in recent years in temperature measurement and control devices. Thermistors, however, have inherent shortcomings which substantially restrict their value and utility and a demand for some means free from these drawbacks has, accordingly, been generally recognized for some time. Thus, it has been known that the problem would be solved through the provision of a resistor having a positive temperature coefficient of resistivity corresponding generally in magnitude and in temperature range to the negative temperature coefficient of resistivity of the best thermistors. But the efforts heretofore stimulated by this recognition have not been successful except that resistors have been developed which have either small positive temperature coefficient of resistivity over a broad temperature range or a relatively large positive temperature coefficient of resistivity over an extremely narrow temperature range. In neither case was the demand met or the art afforded an indication of the direction to travel or the steps to take in order to successfully develop a resistor which could be put to all the uses that were envisioned for it.

It is, accordingly, a primary objective of the present invention to provide a resistor having unique resistivity characteristics rendering it suitable for all the uses that have been awaiting the discovery of such a device.

It is a further important object of this invention to provide a method whereby such a new resistor can consistently, satisfactorily and economically be produced.

It is another object of this invention to provide a resistor which is much less expensive to produce than the resistors of the prior art which have positive temperature coefficients of resistivity over relatively broad temperature ranges.

These and other objectives of this invention have now fully been attained by virtue of several surprising discoveries which we have made. Thus, we have found that unpredictably certain mixtures of nickelous oxide, titanium dioxide, and zinc oxide when subjected in compact form to certain critical firing conditions will produce or exhibit unprecedented resistance increases with increases in temperature over relatively broad temperature ranges. We have further found that both the nickelous oxide content and the titanium dioxide content of these compositions are highly critical to the obtaining of these new results. It has also been discovered that as long as these oxide constituents are present in the critical ranges, substantial amounts or parts of the zinc oxide component may be substituted with magnesium oxide and other compatible materials without substantial detrimental effect upon the desired positive resistance characteristic of the ultimate resistor product. We have also found, surprisingly, that under certain circumstances and particularly those which would be classed as "aging" treatments, the resistance property of what may be considered an excellent resistor, can be substantially and permanently improved. Still further, we have discovered that by changing the composition, or the firing circumstances, or the "aging" treatment we can produce a resistor which is similar to the single crystal silicon resistors in resistivity-temperature characteristics but is much less expensive. Additionally, we have found that we can provide resistors having the desired high positive temperature coefficient of resistivity from below zero centigrade up to about 400° C., and having also a very high negative temperature coefficient of resistivity in the temperature range of minus 100° C. to minus 200° C.

Broadly and generally described, a resistor of this invention will have a positive temperature coefficient of resistivity greater than about 0.4% per degree centigrade over a range of at least 100° C. and it will exhibit a positive temperature coefficient of resistivity at temperatures up to 400° C. Further this resistor will consist essentially of between about 5% and about 16% nickelous oxide and between about 2% and about 20% titanium dioxide, the balance being substantially all zinc oxide. Substantially all the titanium dioxide in this resistor will be in the form of spinel $Zn_2TiO_4$ in a two-phase mixture wherein zinc oxide comprises the other phase and wherein the grain size of the mixture components is between about 2 and about 5 microns.

The method aspect of the present invention, likewise broadly described, comprises the steps of providing a compact of mixed powders consisting essentially of about 5% and about 16% nickelous oxide, of about 2% to 20% titanium dioxide and the balance substantially all zinc oxide, heating the compact and raising its temperature to between about 1250° C. to about 1500° C. and maintaining in that temperature range for at least an hour, and thereafter cooling the compact at a rate no greater than about 100° C. per hour to near room temperature.

In carrying out this method, we have mixed the nickelous oxide, titanium dioxide, and zinc oxide powders together in very finely divided form by wetting them with alcohol or water and subjecting them to vigorous agitation in a mixing device of standard design. The mixed powders are then dried and screened and the fines passing a 20-mesh screen (size opening 0.83 mm.) are selected and pressed into slab or other desired form under pressure suitably on the order of 4½ tons per square inch. To protect the resulting compact from degeneration due to atmosphere effects during firing, the compact is buried in a powder of the sample composition contained in an alumina boat. The boat is then placed in the furnace and the sample is fired at 1400° C. for one hour in a surrounding atmosphere of air. The cooling rate is uniformly 100° per hour to eliminate detrimental quenching effects.

Instead of burying the compact in a powder of its composition, or in zinc oxide powder, or otherwise enclosing it against contact with ambient atmosphere, the compact may be fired in the open under an atmosphere which is non-reactive or neutral and non-detrimental to the compact constituents and the properties of the resulting resistor product. Thus, for example, it is contemplated that an oxygen atmosphere at an appropriate pressure to avoid decomposition may be employed, but it is not contemplated to use hydrogen, for example, because of the oxide reduction which would result during the firing operation. If oxygen-containing atmosphere is used, it should be substantially free from moisture and constituents which would tend to react with or decompose the oxides of the powder mixture of the compact. The time and temperature conditions of the firing operation have a substantial effect upon the resistivity characteristics of the resistors produced in accordance with this invention. The firing temperature range is only about 250° C. wide, but the time factor has a rather broad range in terms of acceptable results in the final product. A resistor of this invention, thus may be produced by firing a compact for as little as one hour at peak temperature, but the strength of the resistivity characteristic desired may be substantially increased where the firing temperature is near the minimum figure and firing is prolonged. A very substantial increase in the positive temperature coefficient of resistivity can, for example, be obtained where a compact is fired at 1250° C. for five hours, instead of for only one hour. It is preferred to maintain the temperature of the compact substantially constant during the firing period so that firing can be controlled for optimum resistivity characteristics simply by regulation of the firing time. In general, the best results are obtained where time and temperature are correlated with maximum temperature firing being limited to one hour and intermediate temperature being proportionately longer up to nearly five hours at temperatures approaching the minimum. Over-firing through the wrong combination of time and temperature will have a detrimental effect upon the resistivity characteristics of the resistors of this invention, but this effect is manifested gradually and progressively rather than abruptly. Accordingly, a resistor prepared, as described above, and fired at 1500° C. for five hours will have a positive temperature coefficient of resistivity approximating that of the single silicon crystal resistor of the prior art, and consequently will have utility and value. Firing for sixteen hours at the maximum temperature, however, would result in the resistor having virtually no positive temperature coefficient of resistivity and have no significant value or use for the purposes with which this invention is concerned.

Preferably as an adjunct to the firing operation, following gradual cooling to approximately room temperature, the resistor is "aged" by a special heat treatment. This heat treatment consists essentially in raising the temperature of the resistor to the point where it exhibits its maximum resistivity and maintaining the resistor at that temperature for several hours. The result of this treatment is, as indicated above, a very substantial increase in its positive temperature coefficient of resistivity. Unlike the principal heat treatment or firing operation, described above, this secondary or aging treatment may be followed by a quench to room temperature or well below without detrimental effect on the desired resisivity characteristics of the body. But as in the firing operation, the resistor may be heated as rapidly as desired from far below room temperature or from room temperature up to the temperature where aging is to be carried out. In the usual case, the aging temperature maximum will approximate 400° C. and, for best results, the resistor will be maintained at this temperature for about sixteen hours. Again, the desired properties of the body will be detrimentally affected by prolonging the aging treatment but the deterioration is relatively slow and gradual so that an ageing period of a week does not render the product useless for the present purposes. The aging time, however, can be too short as it seems to take at least an hour for the resistor to show a substantial increase in its resistivity by this aging process. Further the ageing process will not be successful where the resistor is heated to a temperature substantially above the temperature in which it exhibits its maximum resistivity, particularly if it is thereafter quenched and also if it is maintained at that elevated temperature for as long as an hour. In such cases, the original resistivity characteristic of the material may be largely or wholly lost. On the other hand, no detrimental effect will be produced through the use of the resistor over its entire operating range as it exhibits no tendency towards exhaustion or deterioration as its temperature is varied from far below zero centigrade to its maximum operating temperature.

As previously described, in general, a typical resistor produced, in accordance with the foregoing method, is a body which is composed of a fine-grain, two-phase mixture of zinc oxide and the spinel $Zn_2TiO_4$. Thus, the grain size of the constituents will be less than about 20 microns. Resistors of this invention having the largest positive temperature coefficient of resistance have been composed of grains of an average size between 2 and 5 microns. In any event, Debye-Scherrer patterns taken on these resistors after firing have shown characteristic lines of hexagonal zinc oxide and cubic spinel. The nickel ions may reasonably be presumed to be in solution in both the zinc oxide and $Zn_2TiO_4$ lattice.

Further characterizing these resistors, no experimental evidence has been developed to establish that there is grain boundary wetting of the ZnO grains by the $Zn_2TiO_4$, but this possibility cannot be excluded. The typical density of these resistors is 95% of theoretical density, those containing smaller amounts of $TiO_2$ tending to be more porous. Also, typical compact shrinkage during firing runs about 20%. In appearance, the resistors following the firing operation are typically dark green in color—the darkness in shade being associated with the amount of nickel oxide added. Chemical analysis shows no substantial change in metal ion ratios as a result of firing.

The electrical characteristics of the resistors of this invention are illustrated in the several charts accompanying and forming a part of this specification in which:

FIGURE 1 is a chart bearing two curves contrasting the electrical resistance trends of temperature of prior art resistors and resistors of this invention;

FIGURE 2 is a chart bearing three curves representing resistivity-temperature data showing the beneficial effect of nickel oxide in the compositions of this invention;

FIGURE 3 is a chart bearing six curves illustrating resistivity-temperature data indicating the effect of titanium dioxide in these compositions;

Figure 5:
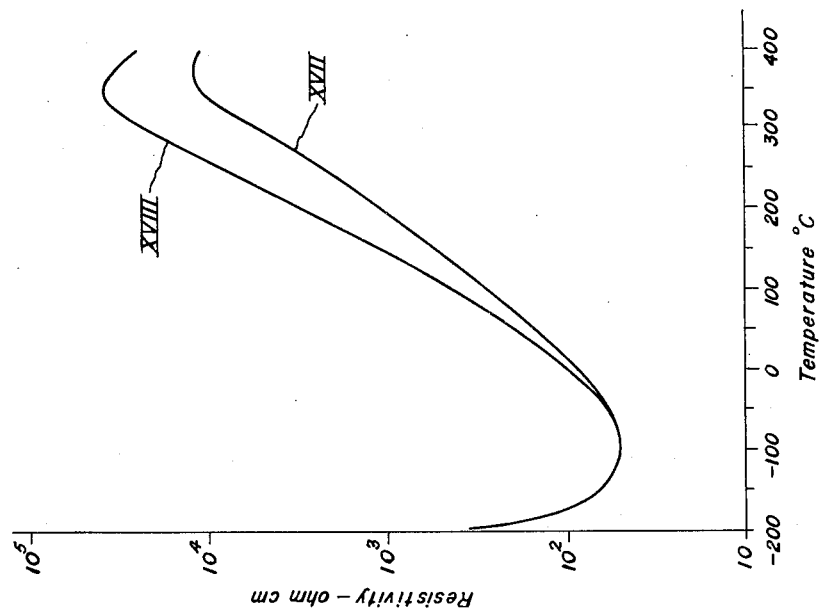
FIGURE 5 is a chart bearing two curves which illustrate the increase in resistivity obtained through the aging process.

More in detail with reference to the charts; it will be noted first that in terms of electrical resistance characteristics in relation to temperature the resistors of the present invention, represented by curve I, are the antithesis of the typical prior art resistor, represented by curve II. At one point, something a little above room temperature, the resistance of these two resistors will be the same. Above that temperature, the resistor of this invention will always have a higher temperature resistance and in upper temperature ranges an enormously higher one than prior conventional resistors. At temperatures below that point, the opposite will be the case with the heretofore typical resistor having a resistivity several orders of magnitude greater at minus 50° C. than the resistance of the resistor of this invention.

In gathering the data upon which all these charts are based, all resistivity measurements were conducted on rod-shaped samples of square cross section which were cut from larger slabs after firing. These rods were 1.8 cm. long and varied in cross section from 10 to 25 mm.² A D.C. potentiometer method was used to measure resistivity so as to avoid measuring the contact resistance and checks were made using A.C. methods up to 100 kilocycles and by reversing the direction of the applied D.C. current. All these methods gave the same value for resistivity in the cases represented by all the curves on these charts.

Contacts were made to the specimen for both current and potential leads by a mechanical pressure contact. The contacts were .010" platinum wires laid across the samples. The current contacts were placed 2 mm. from the sample ends and the potential contacts were spaced 4 mm. apart in the center of the specimen. A Chromel- Alumel thermocouple pressed against the sample was used to measure the temperature. The sample holder was enclosed in a quartz tube to allow measurements to be made from minus 195° C. to 800° C. Measurements were made below room temperature in an atmosphere of dry nitrogen and above room temperature in air atmosphere. Tests were made to establish the fact that the absence of oxygen did not affect the low temperature resistivity of the material.

The vital necessity for a minimum of 5% nickel oxide in the zinc oxide, nickel oxide, titanium dioxide ceramics of this invention is illustrated in the data represented in FIGURE 2. Curve III represents a composition containing 4½% nickel oxide, 10% titanium dioxide and the balance substantially all zinc oxide and the positive temperature coefficient of resistivity is very slight and extends over only a short range of temperature and the body actually has a negative temperature coefficient resistance of greater dimensions in the upper temperature ranges of 300 to 400° C. Curve IV represents a consolidation of data for four different compositions of this invention as follows: 10% nickel oxide, 10% titanium dioxide; 12% nickel oxide, 10% titanium dioxide; 14% nickel oxide, 10% titanium dioxide; and 6% nickel oxide, 10% titanium dioxide and the balance in each case being substantially all zinc oxide. Curve IV represents a typical substantial positive temperature coefficient resistivity over a broad temperature range of up to 400° C. Curve V represents another typical sort of resistor of this invention in which the nickel oxide content is 6%, the titanium dioxide content is 10%, and the balance is substantially all zinc oxide.

The effect of titanium dioxide on the electrical resistivity and temperature coefficient of various ceramic compositions is shown in the data represented by several curves of FIGURE 3. In general, at high temperature, the resistivity increases continuously with increasing titanium dioxide content. At 100° C., however, there seems to be a minimum in the resistivity value somewhere between 2% and 8% titanium dioxide and the resistivity then increases rapidly after 8% titanium dioxide. Curve VI represents data on a ceramic composition containing 8.6% nickel oxide and only 2% titanium dioxide, while curve VII represents a ceramic composition containing 8.8% nickel oxide and no titanium dioxide whatsoever. Curve VIII represents a composition containing 5.3% nickel oxide and 20% titanium dioxide. Curves IX, X and XI represent, respectively, compositions containing 8%, 10% and 12% titanium dioxide and 6% nickel oxide. As before, in each instance, these compositions contain substantially all zinc oxide in addition to the nickel oxide and titanium dioxide amount specified.

Figure 4:
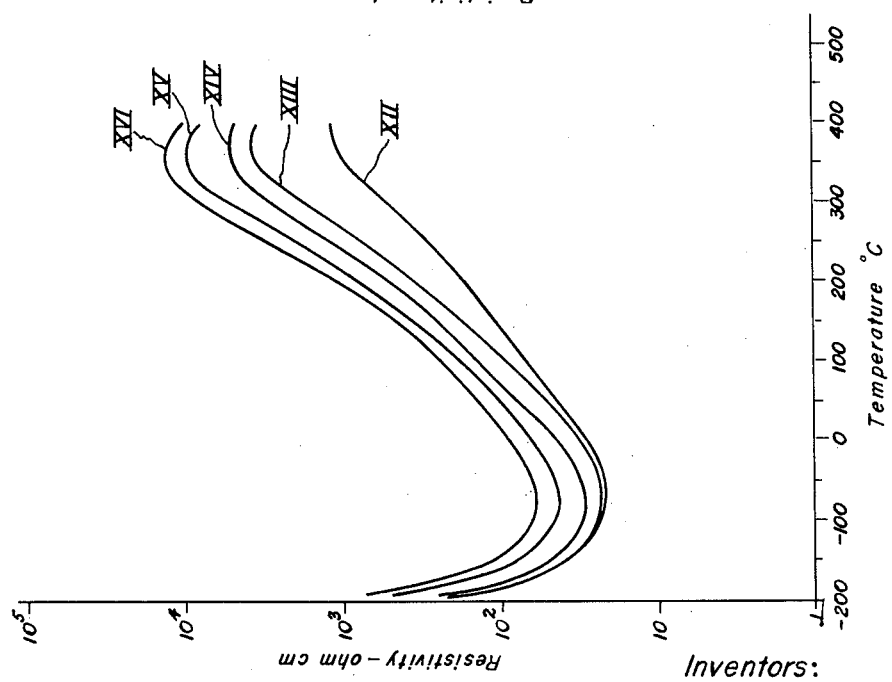
FIGURE 4 is a chart bearing five curves representing resistivity-temperature data indicating the effect of firing conditions on a resistor of this invention.

Curves XII–XVI, inclusive, of FIGURE 4 represent data obtained on varying firing conditions of one preferred ceramic composition of this invention. This composition contains 6% nickel oxide, 8% titanium dioxide and 86% zinc oxide. Curve XII represents the data obtained in the measurement of the resistivity of the temperature range from minus 200° C. to plus 400° C. of a resistor fired at 1500° C. for one hour and subsequently subjected to the aging treatment described above wherein it was heated to 400° C. and maintained at that temperature for sixteen hours. Curves XIII, XIV, XV, and XVI, respectively, represent resistors fired at 1450° C., 1400° C., 1350° C. and 1300° C. for one hour. As in the foregoing cases, the resistors of these latter four curves were subjected to the aging treatment for the purpose of developing the uniquely high positive temperature coefficient resistivity values for these new resistors.

The effect of the aging treatment is clearly illustrated in the chart of FIGURE 5. In this case, a resistor prepared from a mixture of 6% nickel oxide, 11% titanium dioxide (anatase) and 83% zinc oxide, in accordance with the procedure described in detail above, was fired for one hour at 1400° C. and after gradual cooling to room temperature was subjected to the aging treatment of this invention. The lower curve XVII represents the resistivity values at the respective temperatures measured prior to the aging treatment while the upper curve XVIII represents the resistivity values at the corresponding temperatures after the resistor had been fired for 16 hours at 400° C. to effect the aging result.

The electrical resistivities of all of the samples measured after slow cooling from the firing temperature were reproducible and independent of time at temperature for holding times of the order of one half hour. In all cases tested, it was possible also to raise or lower the temperature 300° C. or more within a few minutes and reproduce the resistivities measured by slow heating or cooling provided that the temperature corresponding to the maximum resistivity was not exceeded by 100° C. for more than fifteen minutes.

Figure 6:
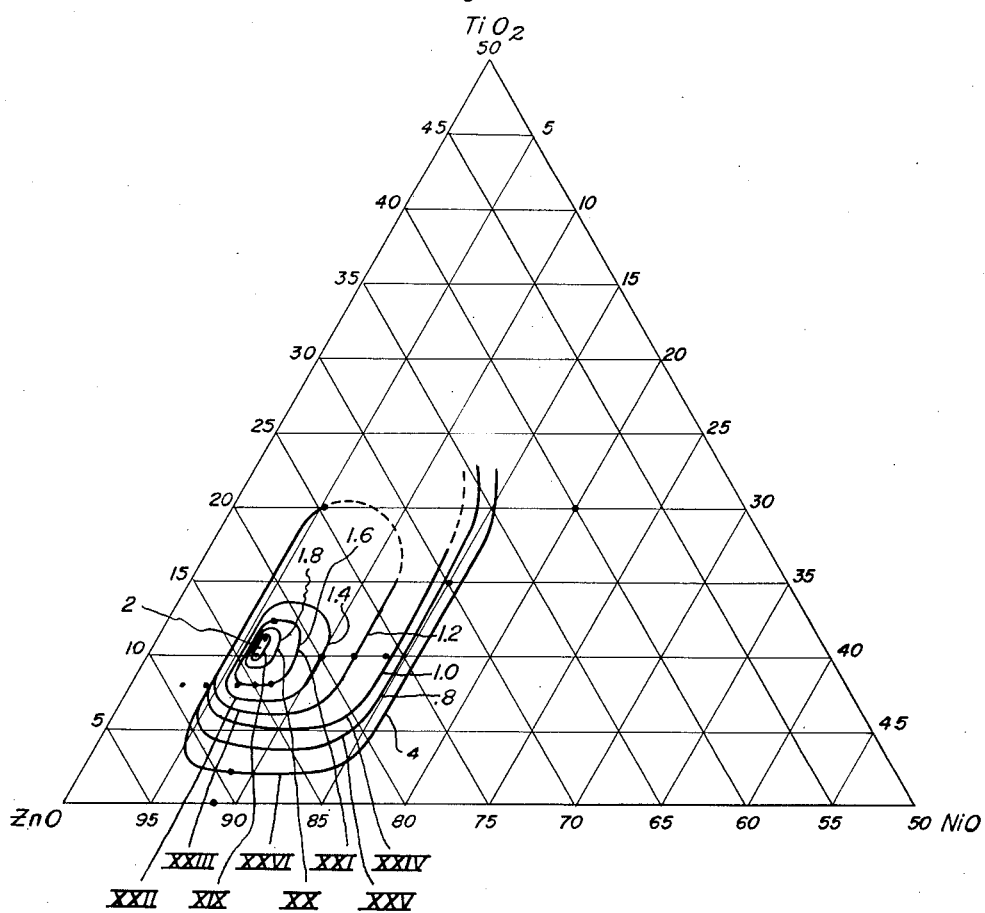
FIGURE 6 is a ternary system diagram bearing curves which represent constant positive temperature coefficient of resistivity for various compositions of this invention.

The role of composition in the determination of the electrical resistivity of the resistors of this invention is illustrated in FIGURE 6, where the experimental points are represented by dots and each curve indicates a constant temperature coefficient of resistivity in the positive range. Thus, each experimental point was determined by making a resistor as described above and measuring its electrical resistance in accordance with the procedures above set forth.

The critical limits previously stated as to composition and ratios of constituents are borne out by the data depicted in FIGURE 6. Maximum resistivity is obtained in the two compositions bounded by curve XIX representing a resistivity increase of 2% per degree centigrade. Curves XX to XXVI, inclusive, likewise represent increases of 1.8% per degree centigrade, 1.6%, 1.4%, 1.2%, 1.0%, 0.8% and 0.4%, respectively. Points or dots outside these curves represent compositions which have lesser positive temperature coefficients of resistivity and these are all, therefore, beyond the purview of this invention and beyond the scope of the appended claims.

The origin of the unique electrical behavior of the resistors of this invention is not now known. The positive temperature coefficient of resistance is too large to be explained on the basis of ordinary temperature dependent impurity scattering found in other semiconducting systems. It is, however, essential in our present view to limit the constituents of the present compositions to the ranges of proportions set out above. There are highly-critical lower limits, as previously described, with respect to the nickel oxide content and the titanium dioxide content. The zinc oxide content is not similarly highly critical, at least in the ranges thus far explored, and it is possible that a substantial part of the zinc oxide component may be substituted with magnesium oxide and possibly other similar substances. Thus, we have been able to obtain good results and resistors meeting the requirements of this invention where as much as about 2½% magnesium oxide has been substituted for the zinc oxide which is still present, however, in an amount greater than 80%. The ratio of nickel oxide, titanium dioxide and zinc oxide is the important consideration and as long as this ratio is maintained within the limits stated above, consistently satisfactory results will be obtained through the preparation and firing procedures previously described in detail.

In compositions of this invention, cobaltous oxide may be substituted for nickelous oxide. Where such a substitution is made, the positive temperature coefficient of resistivity characteristic is consistently obtained in the resulting resistors and the aging treatment described above in detail may be employed to enhance this special feature of these resistors. Further, such substitution should be within the critical limits set forth herein for nickelous oxide and the firing and aging operations should be carried out as has been disclosed and preferably under the optimum time and temperature conditions in terms of the desired electrical resistance properties of the ultimate product. Thus, for instance, a powder mixture of 6% cobaltous oxide, 10% titanium dioxide and 84% zinc oxide prepared as described above by wetting the fines with water, subjecting them to vigorous agitation, then drying and screening through a 20-mesh screen and pressing to shape, is fired at 1400° C. for one hour in a protective body of zinc oxide powder. The resulting resistor is then cooled to room temperature at a uniform rate of about 100° C. per hour to preserve its special feature of positive temperature coefficient of resistivity.

Those skilled in the art will understand that wherever, in the present specification and claims, parts or proportions are stated, reference is made to the weight basis. They will further understand that where the term "nickel oxide" is used, herein, actually NiO or nickelous oxide is intended rather than nickelic oxide.

Although the invention has been described with respect to certain specific embodiments, it will be appreciated that many modifications and changes may be made by those skilled in the art without departing from the spirit of the invention. We intend, therefore, by the appended claims to cover all such modifications and changes as fall within the true spirit and scope of the invention.

What we claim as new and desire to secure by Letters Patent is:

1. The method of producing a resistor having a positive temperature coefficient of resistivity, which comprises the steps of providing a compact of mixed powders consisting essentially of from about 5% to about 16% nickelous oxide, from about 2% to about 20% titanium dioxide and the balance substantially all zinc oxide, heating the compact and raising its temperature to between about 1250° C. and about 1500° C. and maintaining the compact in that temperature range for between about 5 hours and about 1 hour respectively, and thereafter cooling the compact at a rate no greater than about 100° C. per hour to approximately room temperature.

2. The method of producing a resistor having a positive temperature coefficient of resistivity, which comprises the steps of providing a compact of mixed powders consisting essentially of from about 5% to about 16% nickelous oxide, from about 2% to about 20% titanium dioxide and the balance substantially all zinc oxide, heating the compact and raising its temperature to between about 1250° C. and about 1500° C. and maintaining the compact in that temperature range for between about 5 hours and about 1 hour respectively, then cooling the compact at the rate no greater than about 100° C. per hour to approximately room temperature, and thereafter heating the resulting resistor to a temperature where the resistor initially exhibits maximum resistivity and maintaining the resistor at that temperature for several hours and thereby substantially increasing the resistivity of said resistor.

3. The method of producing a resistor having a positive temperature coefficient of resistivity, which comprises the steps of providing a substantially uniform mixture of minus 20-mesh powders consisting essentially of about 6% nickelous oxide, about 11% titanium dioxide and about 83% zinc oxide, pressing a portion of this mixture and thereby forming a body in the shape of the desired resistor, enclosing the resulting body in an additional portion of this mixture, raising the temperature of the enclosed body to about 1400° C. and holding the said body at that temperature for about one hour, and thereafter cooling the compact at the rate of about 100° C. per hour to approximately room temperature.

4. The method of producing a resistor having a positive temperature coefficient of resistivity, which comprises the steps of providing a substantially uniform mixture of minus 20-mesh powders consisting essentially of about 6% nickelous oxide, about 11% titanium dioxide and about 83% zinc oxide, pressing a portion of this mixture and thereby forming a body in the shape of the desired resistor, enclosing the resulting body in an additional portion of this mixture, raising the temperature of the enclosed body to about 1400° C. and holding it at that temperature for about one hour, then cooling the compact at the rate of about 100° C. per hour to approximately room temperature, and thereafter substantially increasing the resistivity of the resulting resistor at elevated temperatures by heating the resistor in air to about 400° C. and maintaining the resistor at that temperature for 16 hours and then cooling the resistor to approximately room temperature.

5. A resistor having a positive temperature coefficient of resistivity in excess of about 0.4% per degree centigrade over a range of at least 100° C. and exhibiting a positive temperature coefficient of resistivity at temperatures up to 400° C., said resistor consisting essentially of between about 5% and about 16% nickelous oxide, between about 2% and about 20% titanium dioxide and the balance being substantially all zinc oxide, substantially all the titanium dioxide being in the form of spinel $Zn_2TiO_4$ in a two-phase mixture wherein zinc oxide comprises the other phase and the average grain size of the mixture components is between about 2 and about 5 microns.

6. A resistor having a positive temperature coefficient of resistivity in excess of about 0.4% per degree centigrade over a range of at least 100° C. and exhibiting positive temperature coefficient of resistivity at temperatures up to 400° C., said resistor consisting essentially of about 6% nickelous oxide, about 12% titanium dioxide and about 82% zinc oxide, substantially all the titanium dioxide being in the form of spinel $Zn_2TiO_4$ in a two-phase mixture wherein zinc oxide comprises the other phase and the average grain size of the mixture components is between about 2 and about 5 microns.

7. A resistor having a positive temperature coefficient of resistivity in excess of about 0.4% per degree centigrade over a range of at least 100° C. and exhibiting positive temperature coefficient of resistivity at temperatures up to 400° C., said resistor consisting essentially of about 6% nickelous oxide, about 10% titanium dioxide and about 84% zinc oxide, substantially all the titanium dioxide being in the form of spinel $Zn_2TiO_4$ in a two-phase mixture wherein zinc oxide comprises the other phase and the average grain size of the mixture components is between about 2 and about 5 microns.

8. A resistor having a positive temperature coefficient of resistivity in excess of about 0.4% per degree centigrade over a range of at least 100° C. and exhibiting positive temperature coefficient of resistivity at temperatures up to 400° C., said resistor consisting essentially of about 6% nickelous oxide, about 8% titanium dioxide and about 86% zinc oxide, substantially all the titanium dioxide being in the form of spinel $Zn_2TiO_4$ in a two-phase mixture wherein zinc oxide comprises the other phase and the average grain size of the mixture components is between about 2 and about 5 microns.

9. A resistor having a positive temperature coefficient of resistivity in excess of about 0.4% per degree centigrade over a range of at least 100° C. and exhibiting positive temperature coefficient of resistivity at temperatures up to 400° C., said resistor consisting of 6% nickelous oxide, 11% titanium dioxide and 83% zinc oxide, substantially all the titanium dioxide being in the form of spinel $Zn_2TiO_4$ in a two-phase mixture wherein zinc oxide comprises the other phase and the average grain size of the mixture components is between about 2 and about 5 microns.

10. A resistor having a positive temperature coefficient of resistivity in excess of about 0.4% per degree centigrade over a range of at least 100° C. and exhibiting positive temperature coefficient of resistivity at temperatures up to 400° C., said resistor consisting of 6% cobaltous oxide, 11% titanium dioxide and 83% zinc oxide, substantially all the titanium dioxide being in the form of spinel $Zn_2TiO_4$ in a two-phase mixture wherein zinc oxide comprises the other phase and the average grain size of the mixture components is between about 2 and about 5 microns.

11. A resistor having a positive temperature coefficient of resistivity in excess of about 0.4% per degree centigrade over a range of at least 100° C. and exhibiting a positive temperature coefficient of resistivity at temperatures up to 400° C., said resistor consisting essentially of between about 5% and about 16% nickelous oxide, between about 2% and about 20% titanium dioxide and the balance being substantially all zinc oxide, substantially all the titanium dioxide being in the form of spinel $Zn_2TiO_4$ in a two-phase mixture wherein zinc oxide comprises the other phase.

12. A resistor having a positive temperature coefficient of resistivity in excess of about 0.4% per degree centigrade over a range of at least 100° C. and exhibiting a positive temperature coefficient of resistivity at temperatures up to 400° C., said resistor consisting essentially of between about 5% and about 16% of an oxide selected from the group consisting of nickelous oxide and cobaltous oxide, between about 2% and about 20% titanium dioxide and the balance being substantially all zinc oxide, substantially all the titanium oxide being in the form of spinel $Zn_2TiO_4$ in a two-phase mixture wherein zinc oxide comprises the other phase and the average grain size of the mixture components is between 2 and about 5 microns.

References Cited in the file of this patent

UNITED STATES PATENTS

| 2,258,646 | Grisdale | Oct. 14, 1941 |
| 2,786,819 | Smith et al. | Mar. 26, 1957 |
| 2,892,988 | Schusterius | June 30, 1959 |

FOREIGN PATENTS

| 475,909 | Canada | Aug. 7, 1951 |
| 262,395 | Switzerland | Oct. 1, 1949 |